(No Model.) 2 Sheets—Sheet 1.

A. HOOVER & R. BROWN.
HARVESTER.

No. 348,495. Patented Aug. 31, 1886.

Attest
J. Watson Sims
J. Simpson Roebuck Jr.

Inventors
Abel Hoover
Robert Brown
by Wood & Boyd
their Attorneys (No Model.) 2 Sheets—Sheet 2.
A. HOOVER & R. BROWN.
HARVESTER.
No. 348,495. Patented Aug. 31, 1886.
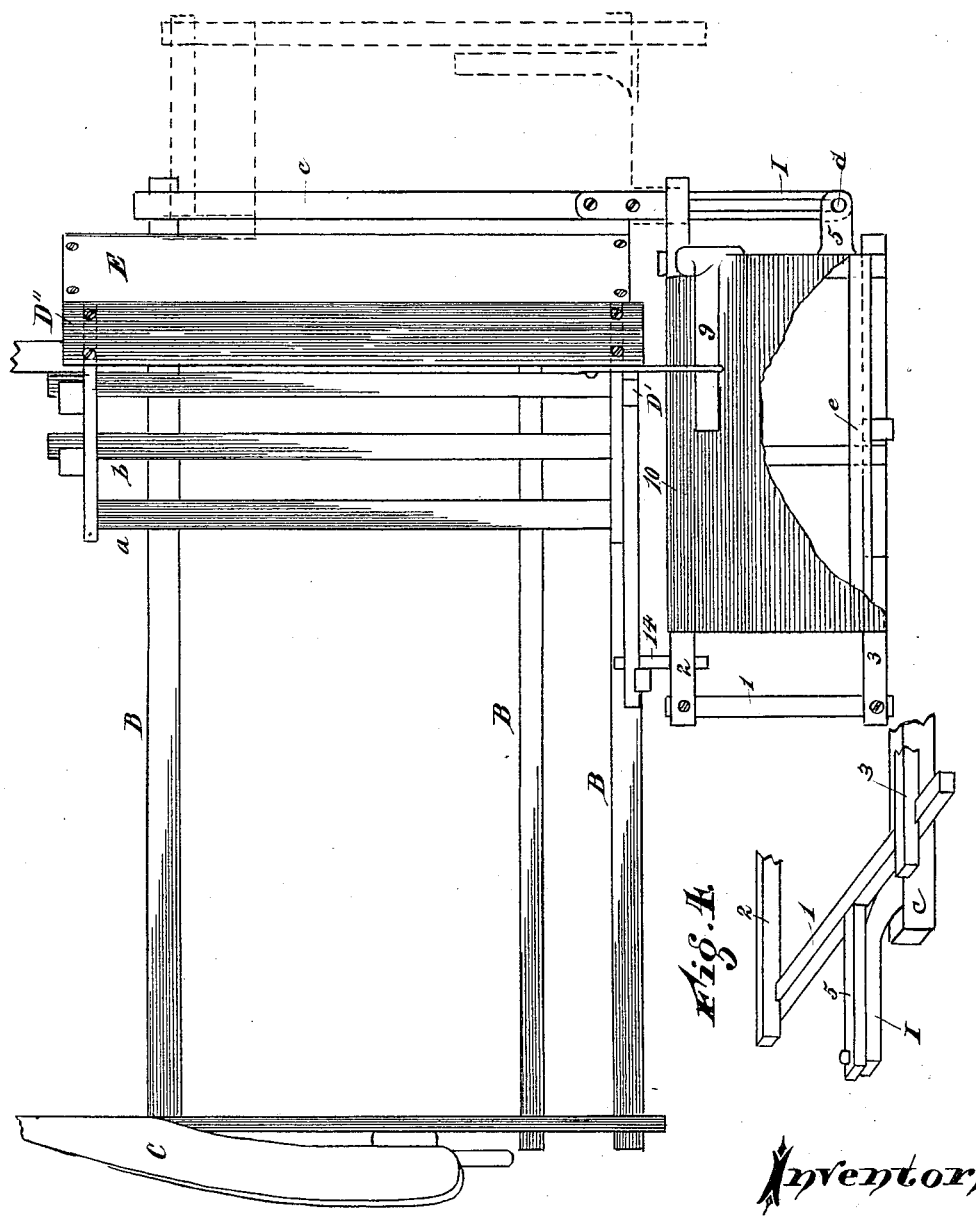
Attest
J. Watson Sims
J. Simpson Roebuck Jr.
Inventors
Abel Hoover
Robert Brown
by Wood & Boyd
their Attorneys &c

UNITED STATES PATENT OFFICE.

ABEL HOOVER AND ROBERT BROWN, OF MIAMISBURG, OHIO, ASSIGNORS TO SAID HOOVER AND WILLIAM GAMBLE, OF SAME PLACE.

HARVESTER.

SPECIFICATION forming part of Letters Patent No. 348,495, dated August 31, 1886.

Application filed September 19, 1885. Serial No. 177,580. (No model.)

*To all whom it may concern:*

Be it known that we, ABEL HOOVER and ROBERT BROWN, residents of Miamisburg, in the county of Montgomery and State of Ohio, have invented certain new and useful Improvements in Harvesters, of which the following is a specification.

Our invention relates to an improvement in harvesters. It refers more particularly to that class of self-binders which employs the binder-frame mounted upon the outer end of the main frame, outside of the driving-wheel. It is adapted to be used with the Appleby and other similar classes of binders.

One of the objects of our invention is to construct the binder-frame and attach it to the main frame so that it may be swung round to the rear of the machine, to reduce the length of the harvester and enable it to be readily transported through gateways.

Another object of our invention is to improve the construction of the binder-frame, so that it may be more readily adjusted.

Other features of our invention will be set forth in the description of the accompanying drawings, making a part of this specification, in which—

Figure 1:
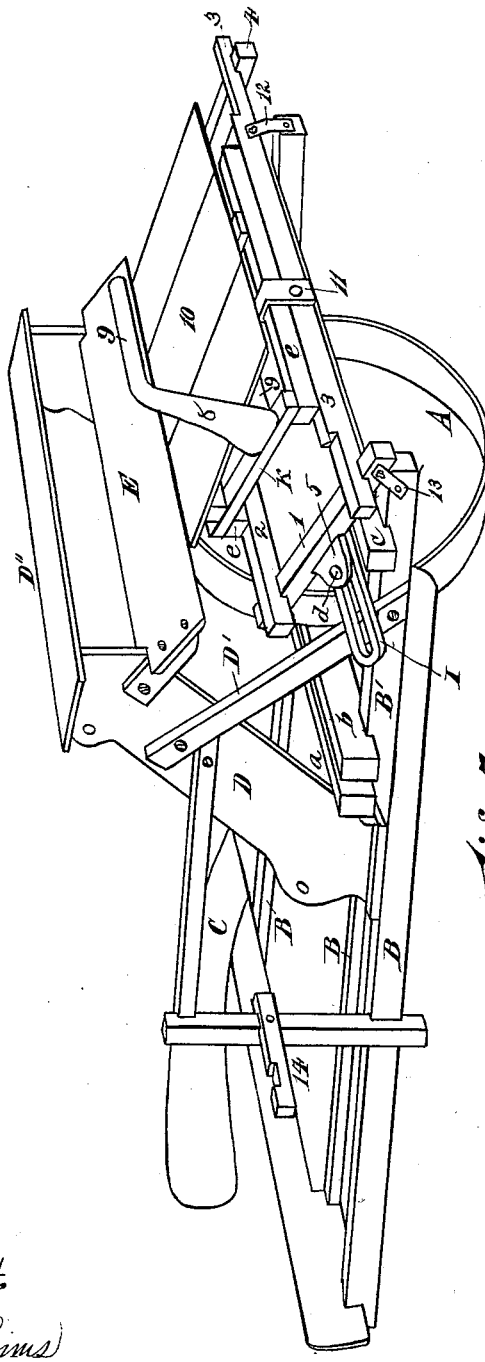
Figure 3:
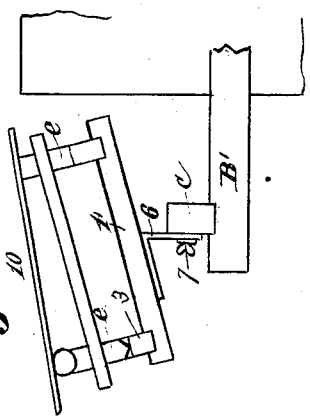

Figure 1 is a perspective view of our improvement attached to the frame of the harvester with the driving, knotting, and packer mechanism omitted. Fig. 2 is a top plan view showing the binder-frame in position for transportation. Fig. 3 is a front end elevation, partly in section, showing the attachment of the binder to the main frame. Fig. 4 is a modified form of hinging the binder-frame to the main frame.

A represents the main driving-wheel.

B represents the longitudinal rails of the main harvester-frame; *a b c*, transverse side rails; C, the divider at the grain end of the cutter-bar; D D' D", the ordinary A-frame attached to and supported upon the main frame of the harvester.

E represents a decking-board over which the grain passes on its way to the binder-table.

B' represents a rail attached to the main frame, so as to form an elevated support above the rear rail, B, to bring the binder-frame in proper relative position to the decking E.

In order to make our binder-frame detachable and adjustable, we secure it to the side-rail, *c*, which is placed outside of the driving-wheel in the following manner: I represents a slotted arm, preferably made of a separate piece and secured to rail *c*, as shown in Fig. 2, or to the sill 1 near the rail *c*, as shown in Fig. 1, and extending some distance in rear of the harvester, being practically an extension of rail *c*. It is slotted to receive a bolt, *d*, which passes through said slot and the frame of the binder, to secure it to the arm I.

We prefer to construct the binder-frame as follows: 1 2 3 4 represent sills of a supporting-frame securely fastened together. 5 represents an extension of the frame, through which passes the bolt *d*. 6 represents a bracket secured to rail 4; 7, a screw-bolt for securing the bracket 6 to rail *c*. Bolt *d* and bracket 6 therefore secure and support this frame to and upon the rail *c*. The frame 1 2 3 4 supports the adjusting-frame, on which the driving mechanism of the binder and knotter is mounted. The knotting mechanism itself is not here shown. It is attached in the usual manner to the frame-piece 8, which is itself supported on the supplemental frame K. This frame K is provided with two shoes or runners, *e*, which rest and are adapted to slide laterally on the lower frame. 9 9 represent arms of frame 8, both projecting forward, one under and the other over the binder-table 10. It is desirable to have the knotting mechanism secured to the frame 8, together with the binding-table 10, adjusted fore and aft, so as to accommodate the knotting-mechanism to different lengths of grain. The frame K is therefore adjusted longitudinally on the supporting-frame, the shoes or runners *e* resting and sliding on the frame-pieces 2 3. 11 represents a metallic loop secured to the frame 3 and passing around over one of the shoes *e*, so as to hold it down in position. Any well-known fastening may be employed for securing it to its adjusted position. 12 13 represent braces connecting the supporting-frame to the main frame of the harvester, so as to steady it and hold it rigidly in position.

In Fig. 4 we have shown a modified form of hinging the supporting-frame to the main frame of the harvester. This modification consists in lengthening the extension 5 on the supporting-frame and hinging it to the supporting-arm I, so that it will simply swing around on the pivot. The other form is the best, as it does not carry the binder-frame so far away from the wheel when folded on the rear of the machine as when the extension is long, as shown in the modification. Either form of construction is, however, embraced in the first clause of claims herein.

The following is the preferred form of adjusting the harvester-frame for transportation. The supporting-frame is released from its attachments by releasing the screw 7 and the braces at both ends, and releasing the attachment of bolt d. The binder-frame is slid or moved back on sills c, the bolt d resting in the slot of arm I, and serving as a guide and way on which to move the binder-frame. When the binder-frame is moved back a sufficient distance to allow it to be swung around, then the end of the frame is carried around to the rear, the bolt d acting as a pivot or hinge on which the frame turns. It is supported in the rear of the machine by means of the arm I and the bracket or arm 14, which is preferably notched, as shown, so as to receive the rail 3, which rests in the slot.

The means herein shown of securing the binder-frame to the main frame is very simple and cheap, and allows it to be readily adjusted to the transporting position, and readily brought back and adjusted to the working position.

The construction of the binder-frame of two sections allows the binder-table to be adjusted longitudinally with respect to the decking E. These two different adjustments necessitate the use of two frames to accomplish the purpose.

We claim—

1. The combination, with the main frame of a harvester, of a binding-frame having bracket 5 and bolt d, a slotted plate, I, on a sill of the main frame, and a rear support, 14, substantially as described.

2. The combination, with the harvester main frame, and a binder-frame composed of the supporting-frame 1 2 3 4, and a supplemental frame, K, the latter having shoes which may move longitudinally on the sills of the supporting-frame, of a connection, 6, and bolt 7, securing the binder-frame to a sill of the main frame, a slotted guide on the latter, a bolt on the binder-frame, engaging with the guide, and a support, 14, on the main frame, substantially as described.

3. In combination with a harvester, the binder-frame made of two sections, one, forming the supporting-frame, detachably connected to the harvester-frame and the other adjustably mounted upon the said supporting-frame, substantially as specified.

4. In combination with the main frame of a harvester, a binder-frame connected thereto by a longitudinally-moving hinge and a support or bracket on the main frame adapted to support the free end of the binder-frame, so that said binder-frame may be slipped backward, and then moved around on its hinge and be supported by the bracket upon the main frame, substantially as specified.

5. In combination with a harvester, a binder-frame mounted upon and pivoted to the harvester by a longitudinally-adjustable hinge connection, substantially as specified.

In testimony whereof we have hereunto set our hands.

ABEL HOOVER.
ROBERT BROWN.

Witnesses:
ROBERT ZAHNER,
E. E. WOOD.